(12) United States Patent
Itou et al.

(10) Patent No.: US 8,240,715 B2
(45) Date of Patent: Aug. 14, 2012

(54) CONNECTION STRUCTURE OF TUBULAR CONNECTION MEMBER AND JOINT MEMBER

(75) Inventors: Ryosuke Itou, Shiga (JP); Tomohiro Nakamura, Shiga (JP)

(73) Assignee: Sekisui Chemical Co., Ltd., Osaka (JP)

( * ) Notice: Subject to any disclaimer, the term of this patent is extended or adjusted under 35 U.S.C. 154(b) by 100 days.

(21) Appl. No.: 12/808,222

(22) PCT Filed: Dec. 18, 2008

(86) PCT No.: PCT/JP2008/073063
§ 371 (c)(1),
(2), (4) Date: Jun. 15, 2010

(87) PCT Pub. No.: WO2009/078461
PCT Pub. Date: Jun. 25, 2009

(65) Prior Publication Data
US 2010/0270795 A1    Oct. 28, 2010

(30) Foreign Application Priority Data
Dec. 19, 2007  (JP) .................. 2007-327588

(51) Int. Cl.
*F16L 55/00* (2006.01)
(52) U.S. Cl. .......................... 285/92; 285/354
(58) Field of Classification Search ........... 285/92, 285/354, 359, 386
See application file for complete search history.

(56) References Cited

U.S. PATENT DOCUMENTS

| | | | |
|---|---|---|---|
| 1,195,433 A * | 8/1916 | Bailey | 285/92 |
| 5,188,398 A * | 2/1993 | Parimore et al. | 285/92 |
| 5,215,336 A * | 6/1993 | Worthing | 285/92 |
| 5,586,790 A * | 12/1996 | Bynum | 285/92 |
| 5,746,454 A * | 5/1998 | Webb | 285/92 |
| 5,931,508 A * | 8/1999 | Spriegel | 285/92 |
| 6,142,535 A * | 11/2000 | Nishio et al. | 285/92 |
| 6,334,632 B1 * | 1/2002 | Nishio et al. | 285/92 |
| 6,692,036 B2 * | 2/2004 | Kingsford et al. | 285/92 |
| 6,905,142 B2 * | 6/2005 | Do et al. | 285/92 |

(Continued)

FOREIGN PATENT DOCUMENTS

JP          59-157191 U       10/1984

(Continued)

OTHER PUBLICATIONS

International Search Report for the Application No. PCT/JP2008/073063 mailed Jan. 20, 2009.

*Primary Examiner* — David E Bochna

(74) *Attorney, Agent, or Firm* — Cheng Law Group, PLLC

(57) ABSTRACT

In a connection structure of a tubular connection member and a joint member according to an embodiment, a joint member (20) with a cap nut (30) mounted thereon is connected to a tubular connection member (12) with a spiral ridge (14) and a flange (16). The cap nut (30) has a spiral groove formed in the inner peripheral surface and includes a detent member (35) having a movable portion (36) and an extending portion (37). A spigot portion of the joint member (20) is inserted into the tubular connection member (12), and the cap nut (30) is screwed in. Then, the extending portion (37) of the detent member (35) is locked by a locking protrusion (162) provided on the flange (16) of the tubular connection member (12).

11 Claims, 14 Drawing Sheets

U.S. PATENT DOCUMENTS

| | | | |
|---|---|---|---|
| 7,431,342 B2 * | 10/2008 | Sauer | 285/92 |
| 7,571,937 B2 * | 8/2009 | Patel | 285/92 |
| 8,042,838 B2 * | 10/2011 | Buckler et al. | 285/92 |

FOREIGN PATENT DOCUMENTS

| | | |
|---|---|---|
| JP | 62-24091 A | 2/1987 |
| JP | 11-287365 A | 10/1999 |
| JP | 3578696 B2 | 7/2004 |
| JP | 2005-188682 A | 7/2005 |
| JP | 3843228 B2 | 8/2006 |
| JP | 3843288 B2 | 8/2006 |
| JP | 2007-514895 A | 6/2007 |

* cited by examiner (a)

(b)

(a)

(b)

(a)

(b)

CONNECTION STRUCTURE OF TUBULAR CONNECTION MEMBER AND JOINT MEMBER

TECHNICAL FIELD

The present invention relates to a connection structure of a tubular connection member and a joint member.

BACKGROUND ART

A residential water and hot-water supply piping system usually adopts a header method, in which a water supply main pipe and a hot-water supply main pipe are connected respectively to a metallic water supply header and a metallic hot-water supply header, and the respective headers branch into multiple water supply branch pipes and multiple hot-water supply branch pipes that are connected to connection portions of facilities and equipment.

In header piping systems adopting such a header method, a main pipe installed in a residential underfloor space is connected first to the body of a header and then to branch pipes of the header through multiple branch connection portions, and the branch pipes run through the underfloor space and are connected to connection portions of facilities and equipment.

To connect a main pipe and branch pipes respectively to a header body and branch connection portions, such header piping systems may adopt, for example in view of easy replaceability of the main pipe and the branch pipes, a connection method in which pipe joints connected to either a main pipe or branch pipes are screwed into a header body or branch connection portions.

On the other hand, headers made of synthetic resins are used in recent years. In cases where pipe joints are coupled to pipes by screws, synthetic resin headers have strength disadvantages because large forces act on screwed portions. Thus, in cases of using synthetic resin headers, a method known as fastener connection is adopted as described in Patent Document 1, the method using elastic splicing fittings to connect a header body and a pipe joint and to connect branch connection portions and pipe joints, with flanges butting against one another.

If headers are made of synthetic resins, the branch connection portions may possibly be expanded due to internal water pressures. With this in view, Patent Document 2 proposes a technique for coupling branch connection portions to plugs provided with a spread preventing portion that prevents a branch connection portion from being expanded due to internal water pressures.

Patent Document 1: JP2005-188682A
Patent Document 2: Japanese Patent No. 3578696

SUMMARY OF INVENTION

Problem to be Solved by the Invention

Now, the elastic splicing fittings described in Patent Document 1 are usually made of a spring material including a stainless steel plate. However, in cases where such elastic splicing fittings are used to connect a header body and a pipe joint and to connect branch connection portions and pipe joints, for example if water hammer phenomena repeatedly occur due to rapid closure of a faucet, pull-out forces act on the connection portion between the header body and the pipe joint and try to pull them apart. Also, since synthetic resin headers have lower strength than in cases of metallic pipe joints, their header flanges may be damaged.

Thus, Patent Document 1 describes a reinforcing ring to be mounted on an annular groove where a flange is formed. However, in cases where the reinforcing ring has a small thickness, it is mounted easily on the annular groove, but is subject to deformation during mounting. In addition, since the reinforcing ring has small reinforcing effects, the effects of dispersing pull-out forces acting on flanges is small as well. Moreover, although there is no problem in cases where headers are made of plastics such as engineering plastics that have high strength at high temperatures, a reinforcing ring cannot be applied in cases where headers are made of general-purpose synthetic resins such as olefin resins or vinyl chloride resins because strength is not enough.

On the contrary, a reinforcing ring having a great thickness has the disadvantage of difficult mounting because it is resistant to deformation. With a large-thickness reinforcing ring, the connection portion between a header and a pipe joint is resistant to deformation, but since its outside diameter is defined by elastic splicing fittings, the thickness of the flange resin is reduced correspondingly, which causes deterioration of strength.

The connection structure described in Patent Document 2 prevents degradation in water cut-off properties due to the expansion of branch connection portions, but it still faces the challenge of preventing damage to screw-coupled portions. That is, if a header is made of cross-linked polyethylene that is a general-purpose resin, excessive screwing-in may cause breakage of screws. Or, in cases of loose screwing-in, axial release forces may act due to internal water pressures, or vibrations and shocks may be generated due to pulsating water pressure. This may loosen screws and, in the worst case, may cause plugs to be pulled out of branch connection portions of the header in the axial direction.

Thus, in order to avoid loose screwing-in, the connection structure of Patent Document 2 provides anti-rotation protrusions on a header body and anti-rotation portions at the tips of plugs so that the anti-rotation portions are brought into engagement with the anti-rotation protrusions by screwing the plugs into set positions. However, synthetic resin headers have concerns about the strength of the anti-rotation protrusions, because turning forces trying to loosen screws increase as the screw pitch increases. The turning forces are weakened if the screw pitch decreases, which however reduces the amount of axial travel per rotation during screwing-in and thus prevents an increase in the height of the anti-rotation protrusions. Thus, the structure as described in Patent Document 2 that prevents loose screwing still has the problem of strength.

If the engagement of anti-rotation portions with anti-rotation protrusions is strengthened in consideration of strength aspects, the following events may occur, such as it becomes difficult to separate plugs from a header, anti-rotation protrusions may be damaged exceeding their elastic limitations, or a header needs replacement.

The present invention has been made in view of the problems described above and provides a connection structure of a tubular connection member and a pipe joint that reliably prevents loose screwing and breakage and allows a tubular connection member and a joint member in a synthetic resin header, for example, to be connected by screws.

Means for Solving the Problems

To solve the above-described problems, a preferred embodiment of the present invention includes a tubular connection member made of a synthetic resin and having a spiral ridge and a flange with a locking protrusion being formed on one end of its outer peripheral surface, a joint member having at one end a spigot portion that is insertable into the tubular connection member and at the other end a pipe-mounting portion that is connectable to a connecting pipe, and a cap nut that is non-removably and rotatably mounted on the joint member, a spiral groove being formed in the inner peripheral surface, the spiral groove corresponding to the spiral ridge of the tubular connection member, and the cap nut being provided with a detent member, the detent member having a movable portion that is integrally coupled at one end to the cap nut and an extending portion that extends in an axial direction from the movable portion beyond an end face of the cap nut, wherein the spigot portion of the joint member is inserted into the tubular connection member and the cap nut is screwed into the tubular connection member so as to bring the extending portion of the detent member to be locked by the locking protrusion of the flange of the tubular connection member.

According to this embodiment, the spigot portion of the joint member is inserted into an open end of the tubular connection member, and then the cap nut is screwed into the tubular connection member. This allows the spiral groove of the cap nut to be threadedly engaged with the spiral ridge of the tubular connection member, and a predetermined angle of rotation positions the cap nut both circumferentially and axially in abutment against the side face of the flange, which prevents any further rotation. Simultaneously with the screwing-in of the cap nut, the extending portion of the dent member on the cap nut is brought into contact with the peripheral edge of the flange of a branch connection portion and is elastically deformed so as to expand the movable portion, thus running on the peripheral surface of the flange. Then, the extending portion of the detent member slides along the peripheral surface of the flange and at last is locked by the locking protrusion of the flange, and at the same time, the detent member is freed from elastic deformation and returns to its original shape.

Since the spigot portion of the joint member is inserted into the tubular connection member and the cap nut of the joint member is screw-coupled thereto, the tubular connection member has improved water cut-off properties without being expanded due to internal water pressures. Also, further screwing-in is stopped by the cap nut abutting against the flange of the tubular connection member. Moreover, the extending portion of the detent member on the cap nut prevents circumferential movements by being locked by the locking protrusion formed on the flange of the tubular connection member. The detent member thus prevents the cap nut from rotating relative to the tubular connection member, which prevents the cap nut from being rotated and loosed due to axial release forces caused by internal water pressures or due to vibrations or shocks caused by pulsating water pressure and thereby reliably prevents releases of the joint member and occurrence of water leakage.

In addition, a simple operation such as inserting the spigot portion of the joint member into the tubular connection member and rotating the cap nut a set angle without using any tool, for example, enables the cap nut to abut against the flange and enables the extending portion of the detent member to be locked by the locking protrusion of the flange. This considerably simplifies connecting operations. Moreover, the spiral ridge and the spiral groove is not broken due to excessive screwing-in of the cap nut, and loose screwing-in does not occur because the locking of the extending portion and the locking protrusion is confirmed not only visually but also by the sound of mounting as the dente member is mounted on the cap nut when it is restored from its elastically deformed state.

Here, preferable examples of the synthetic resin used for the tubular connection member in cases for example where strength is required at high temperatures include, but are not limited to, engineering plastics such as polyethersulfone and polyphenylsulfone. On the other hand, examples of the resin in cases where strength is not particularly required at high temperatures, such as for water supply, include vinyl chloride and olefin resins such as cross-linked polyethylene, polypropylene, and polybutylene.

Moreover, the joint member may be made of metal, but if it is made of a resin, examples of the resin in low-temperature cases, such as for water supply, include vinyl chloride, polybutylene, cross-linked polyethylene, and polyethylene, and examples of the resin in high-temperature cases, such as for hot-water supply, include engineering plastics such as polyacetal, polyethersulfone, polyphenylene sulfide, polysulfone, and polyphenylsulfone.

Moreover, preferable examples of a synthetic resin used to form the cap nut in high-temperature cases, such as for hot-water supply, include engineering plastics such as polyacetal, polyethersulfone, polyphenylene sulfide, polysulfone, and polyphenylsulfone. On the other hand, examples of the resin in low-temperature cases, such as for water supply, include general-purpose resins such as vinyl chloride, polybutylene, cross-linked polyethylene, and polyethylene.

Another preferred embodiment of the present invention includes a tubular connection member made of a synthetic resin and having a spiral ridge and a flange with an engaging recessed portion being formed on one end of the outer peripheral surface, a joint member having at one end a spigot portion that is insertable into the tubular connection member and at the other end a pipe-mounting portion that is connectable to a connecting pipe, and a cap nut that is non-removably and rotatably mounted on the joint member, a spiral groove being formed in its inner peripheral surface, the spiral groove corresponding to the spiral ridge of the tubular connection member, and the cap nut being provided with a detent member, the detent member having a movable portion that is integrally coupled at one end to the cap nut and an extending portion that extends in an axial direction from the movable portion beyond an end face of the cap nut and has an engaging lug that is engageable in the engaging recessed portion of the flange of the tubular connection member, wherein the spigot portion of the joint member is inserted into the tubular connection member and the cap nut is screwed into the tubular connection member so as to bring the engaging lug of the detent member to be engaged in the engaging recessed portion of the flange of the tubular connection member.

According to this embodiment, the spigot portion of the joint member is inserted into an open end of the tubular connection member, and then the cap nut is screwed into the tubular connection member. This allows the spiral groove of the cap nut to be threadedly engaged with the spiral ridge of the tubular connection member, and a predetermined angle of rotation positions the cap nut both circumferentially and axially in abutment against the side face of the flange, which prevents any further rotation. Simultaneously with the screwing-in of the cap nut, the engaging lug of the dent member on the cap nut is brought into contact with the peripheral edge of the flange of a branch connection portion and is elastically deformed so as to expand the movable portion, thus running on the peripheral surface of the flange. Then, the engaging lug of the detent member slides along the peripheral surface of the flange and at last drops and is engaged in the engaging recessed portion of the flange, and at the same time, the detent member is freed from elastic deformation and returns to its original shape.

Since the spigot portion of the joint member is inserted into the tubular connection member and the cap nut of the joint member is screw-coupled thereto, the tubular connection member has improved water cut-off properties without being expanded due to internal water pressures. Also, further screwing-in is stopped by the cap nut abutting against the flange of the tubular connection member. Moreover, the engaging lug of the detent member on the cap nut prevents circumferential movements by being engaged in the engaging recessed portion formed in the flange of the tubular connection member. The detent member thus prevents the cap nut from rotating relative to the tubular connection member, which prevents the cap nut from being rotated and loosed due to axial release forces caused by internal water pressures or due to vibrations or shocks caused by pulsating water pressure and thereby reliably prevents releases of the joint member and occurrence of water leakage.

In addition, a simple operation such as inserting the spigot portion of the joint member into the tubular connection member and rotating the cap nut a set angle without using any tool, for example, enables the cap nut to abut against the flange and enables the engaging lug of the detent member to be engaged in the engaging recessed portion of the flange. This considerably simplifies connecting operations. Moreover, the spiral ridge and the spiral groove is not broken due to excessive screwing-in of the cap nut, and loose screwing-in does not occur because the engagement of the engaging recessed portion and the engaging lug is confirmed not only visually but also by the sound of mounting as the dente member is mounted on the cap nut when it is restored from its elastically deformed state.

Here, preferable examples of the synthetic resin used for the tubular connection member in cases for example where strength is required at high temperatures include, but are not limited to, engineering plastics such as polyethersulfone and polyphenylsulfone. On the other hand, examples of the resin in cases where strength is not particularly required at high temperatures, such as for water supply, include vinyl chloride and olefin resins such as cross-linked polyethylene, polypropylene, and polybutylene.

Moreover, the joint member may be made of metal, but if it is made of a resin, examples of the resin in low-temperature cases, such as for water supply, include vinyl chloride, polybutylene, cross-linked polyethylene, and polyethylene, and examples of the resin in high-temperature cases, such as for hot-water supply, include engineering plastics such as polyacetal, polyethersulfone, polyphenylene sulfide, polysulfone, and polyphenylsulfone.

Moreover, preferable examples of a synthetic resin used to form the cap nut in high-temperature cases, such as for hot-water supply, include engineering plastics such as polyacetal, polyethersulfone, polyphenylene sulfide, polysulfone, and polyphenylsulfone. On the other hand, examples of the resin in low-temperature cases, such as for water supply, include general-purpose resins such as vinyl chloride, polybutylene, cross-linked polyethylene, and polyethylene.

Preferably, the spiral ridge of the tubular connection member may include two spiral ridges extending approximately 360 degrees, and the spiral groove of the cap nut may include two spiral grooves extending approximately 360 degrees. This allows the cap nut to abut against the flange of the branch connection portion with an approximately 180 degree rotation, and also allows the engaging lug of the detent member to be engaged in the engaging recessed portion of the flange or the extending portion of the detent member to be locked by the locking protrusion, which enables substantially one-touch connecting operations.

Preferably, according to another embodiment of the present invention, the cap nut may have operating parts circumferentially formed on its outer peripheral surface at intervals. This makes it easy to rotate the cap nut.

Preferably, the flange of the tubular connection member may have an approximately elliptical shape and have either an engaging recessed portion or a locking protrusion formed in positions relative to a major axis direction of the flange. This allows the engaging lug or the extending portion of the detent member to run on the outer peripheral surface of the flange of the branch connection portion from the minor-axis side, thus making it easy to lead the engaging lug or the extending portion onto the outer peripheral surface of the flange.

Preferably, the movable portion of the detent member may be either arc-shaped or arm-shaped with one end integrally coupled to the cap nut.

Preferably, the tubular connection member may be either a header body that forms a header of a synthetic resin or a branch connection portion that protrudes from a header body.

The above-described embodiments reliably prevent loose screwing and breakages and allow tubular connection members and joint members in a synthetic resin header, for example, to be connected by screws.

Figure 1:
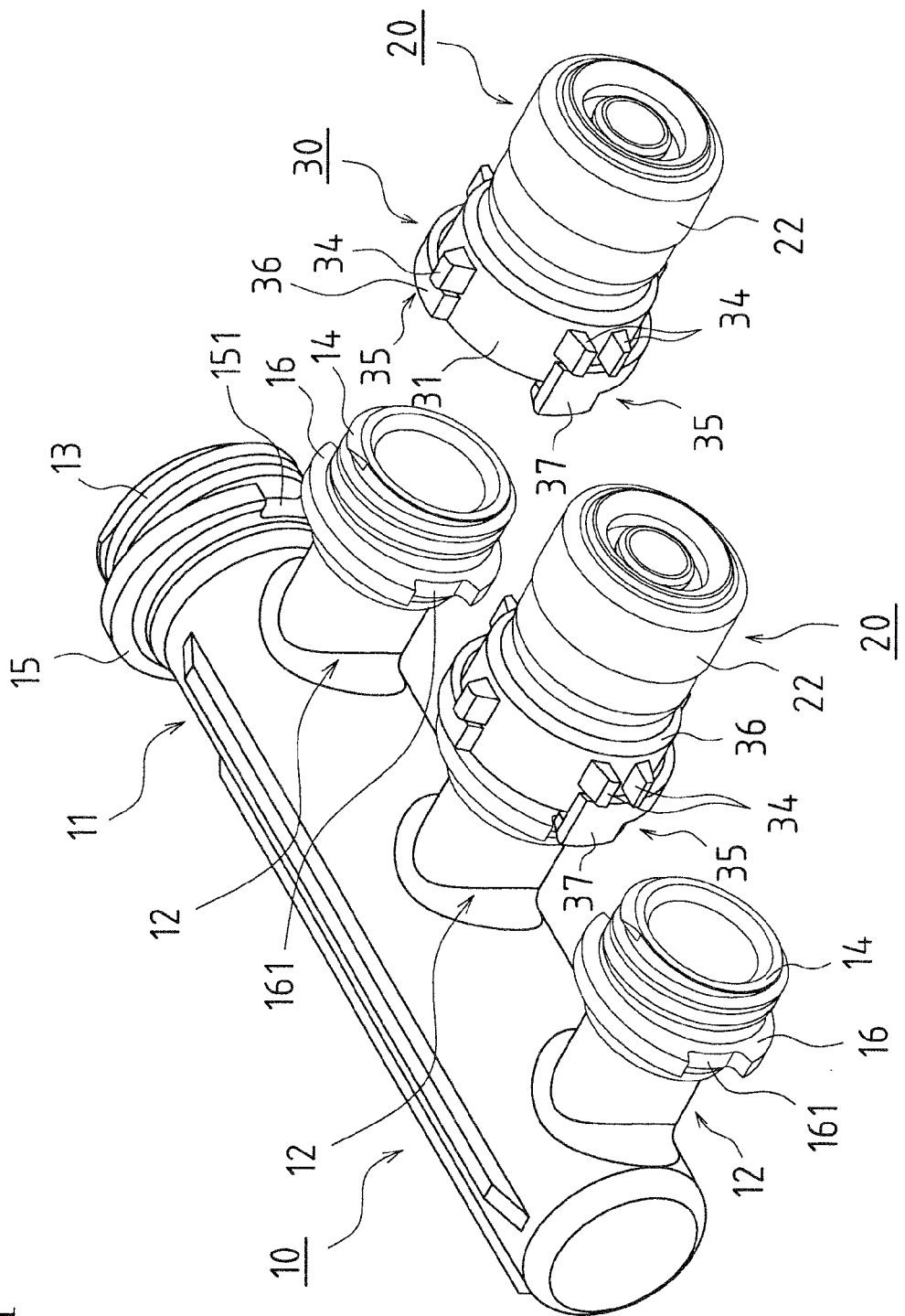
FIG. 1 is a perspective view of a connection structure of a tubular connection member and a joint member according to an embodiment of the present invention.

DESCRIPTION OF REFERENCE NUMERALS 10 header
11 header body 12 branch connection portion
13, 14 spiral ridge
15, 16 flange
151, 161 engaging recessed portion
152, 162 locking protrusion
20, 25 joint member
21 spigot portion
22 pipe-mounting portion
30 cap nut
31 nut body
33 spiral groove
34 operating part
35 detent member
36 movable portion
37 extending portion
38 engaging lug
40 block cap
41 plug body
50 connect adapter

BEST MODE FOR CARRYING OUT THE INVENTION

Now, the best modes for carrying out the present invention will be described with reference to the drawings.

FIRST EMBODIMENT

FIG. 1 is a perspective view of a connection structure of a tubular connection member and a joint member according to an embodiment of the present invention.

The connection structure according to the present embodiment is configured to include a header 10 made of a synthetic resin, a joint member 20 that is connectable to a branch connection portion 12 that is provided as a tubular connection member on the header 10, and a cap nut 30 that is rotatably and non-removably mounted on the joint member 20.

The header 10 includes a generally cylindrical header body 11 that is closed at one end and is open at the other end, and multiple branch connection portions 12 that protrude from the outer peripheral surface of the header body 11. The header body 11 and the branch connection portions 12 respectively have two spiral ridges 13 and 14 that are formed extending approximately 360 degrees on their outer peripheral surfaces near their open ends. The header body 11 and the branch connection portions 12 also have generally elliptical flanges 15 and 16, respectively, that are provided near the bases of the spiral ridges 13 and 14. The flanges 15 and 16 of the header body 11 and the branch connection portions 12 have arc-shaped engaging recessed portions 151 and 161, respectively.

In the illustrated embodiment, the flange 15 of the header body 11 of the header 10 has the engaging recessed portions 151 formed in opposed positions. Also, the flanges 16 of the branch connection portions 12 of the header 10 each have the engaging recessed portions 161 formed in opposed positions.

As a synthetic resin for forming the header 10, cross-linked polyethylene may be adopted, which may be used for water and hot-water supply and thereby lowers the cost.

Next, a connection structure of the open end of a branch connection portion 12 and a joint member 20 will be described.

Figure 2:
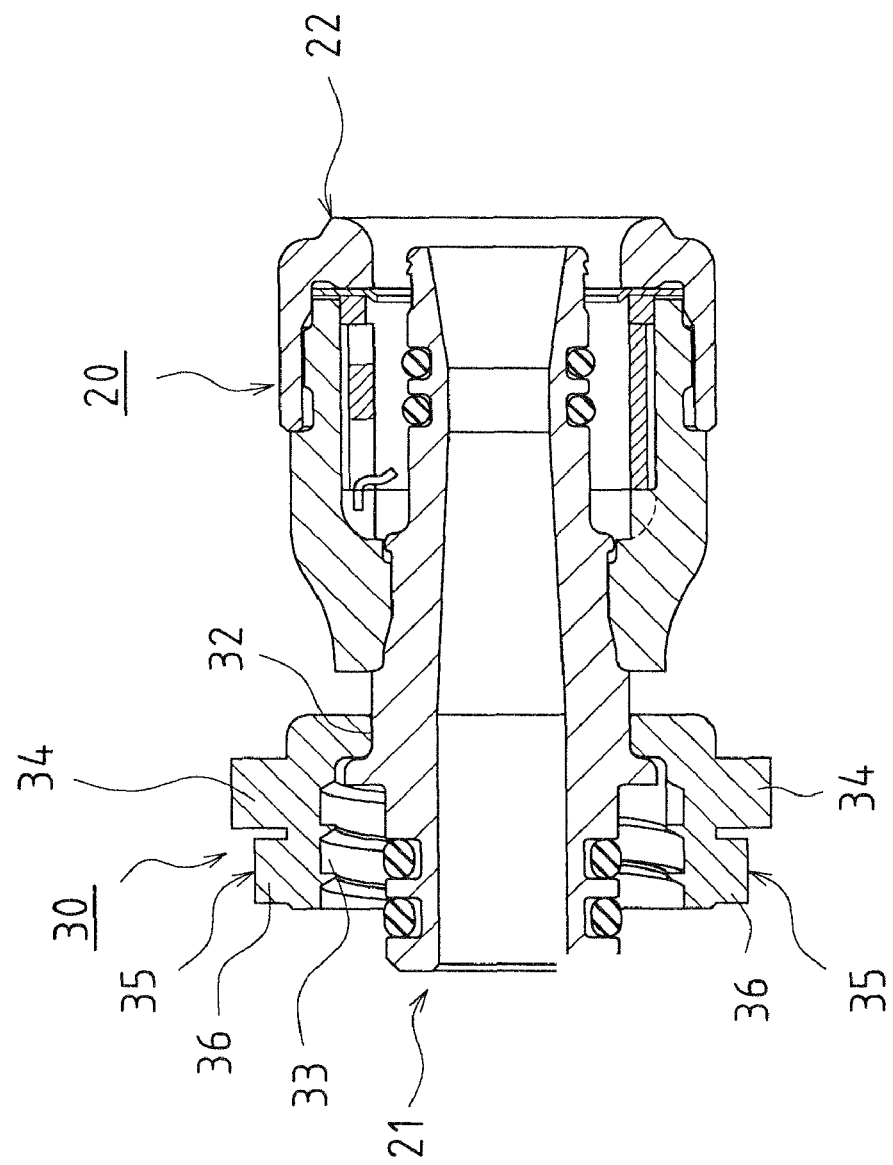
FIG. 2 is a cross-sectional view illustrating the connection structure in FIG. 1 with some parts omitted.

As illustrated in FIG. 2, the joint member 20 has a spigot portion 21 at one end that is insertable into the branch connection portion 12. The joint member 20 also has a pipe-mounting portion 22 at the other end that is attachable to a branch pipe (not shown) as a connecting pipe. The joint member 20 has a well-known one-touch joint structure (see Japanese Patent No. 3843228) that is formed by integrally coupling the pipe-mounting portion 22 to the spigot portion 21. Also, the joint member 20 is manufactured of brass, bronze, a composite structure of such metals and a synthetic resin, or a synthetic resin.

The joint member 20 is manufactured by integrally coupling the pipe-mounting portion 22 to the spigot portion 21. In manufacture, the cap nut 30 is mounted on the spigot portion 21 and the pipe-mounting portion 22 is coupled thereto so that the cap nut 30 is non-removably and rotatably mounted on the joint member 20.

As illustrated in FIGS. 3(a), 3(b), 4(a), and 4(b), the cap nut 30 includes a nut body 31 and a release preventing portion 32. The nut body 31 has an inner peripheral surface having an inside diameter that corresponds to the outside diameter of the outer peripheral surface of the open ends of the branch connection portions 12, and an outer peripheral surface having a diameter that is smaller than the minor axis diameter of the flange 16. The release preventing portion 32 is formed to a diameter smaller than that of the inner peripheral surface of the nut body 31. The cap nut 30 is non-removably and rotatably held on the joint member 20 by the spigot portion 21 of the joint member 20 being inserted through the nut body 31 into the release preventing portion 32 and by the pipe-mounting portion 32 being coupled to the spigot portion 21.

In the inner peripheral surface of the nut body 31 of the cap nut 30, the two spiral grooves 33 extend approximately 360 degrees so as to be threadedly engageable with the two spiral ridges 14 formed on the open end of the outer peripheral surface of the branch connection portion 12. Also, radially protruding operating parts 34 are circumferentially spaced at approximately 90-degree intervals on approximately one half of the outer peripheral surface of the nut body 31 of the cap nut 30 on the side near the release preventing portion 32. Specifically, from among the four different circumferential locations where the operating parts 34 are formed, a pair of operating parts 34 protrude from each of a pair of opposed locations. Also, a single operation portion 34 protrudes from each of the other pair of opposed locations.

Also, a pair of detent members 35 are provided on approximately the other half of the outer peripheral surface on the side opposite from the release preventing portion 32. The detent members 35 are formed so that their one ends are each circumferentially in the approximately same location where a single operating part 34 protrudes from the outer peripheral surface of the nut body 31. Moreover, the detent members 35 each include a movable portion 36 and an extending portion 37.

The movable portion 36 has an outer peripheral surface having an outside diameter that substantially matches the major axis diameter (major diameter) of the flange 16 of the branch connection portion 12, and extends over a range of approximately 90 degrees along the arc of the outer peripheral surface of the nut body 31. The extending portion 37 extends in the axial direction from the side end face of the other end (i.e., the location where a pair of operating parts 34 protrude) of the movable portion 36 beyond the end face of the nut body 31. The extending portion 37 has a length that corresponds to the circumferential length of the engaging recessed portions 161 formed in the flange 16 of the branch connection portion 12. Moreover, the extending portion 37 has an engaging lug 38, which is formed circumferentially and has a height substantially equivalent to a step height of the engaging recessed portions 161 of the flange 16.

Figure 3:
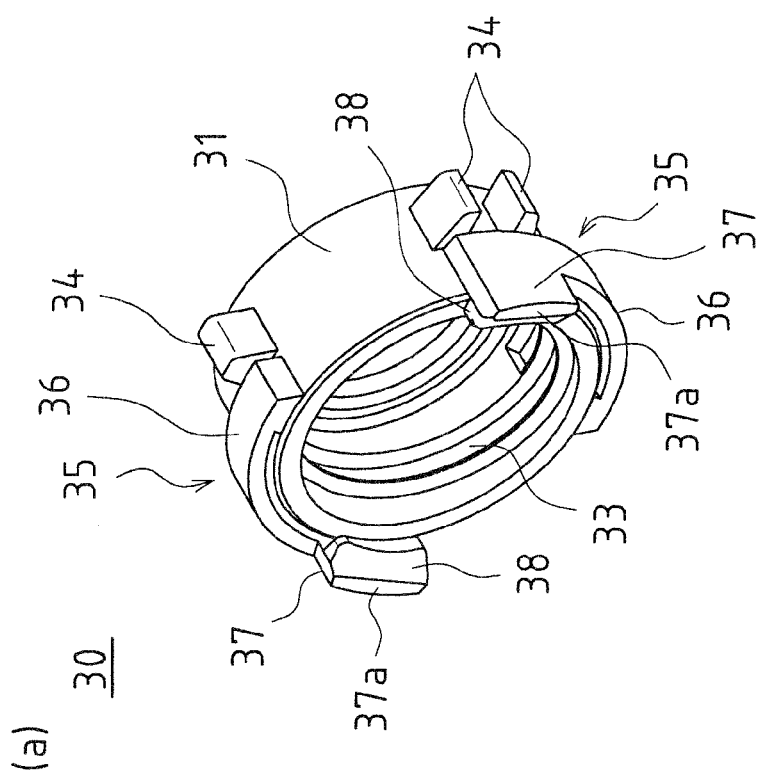
FIGS. 3(a) and 3(b) are perspective views of a cap nut in FIG. 1.
Figure 3:
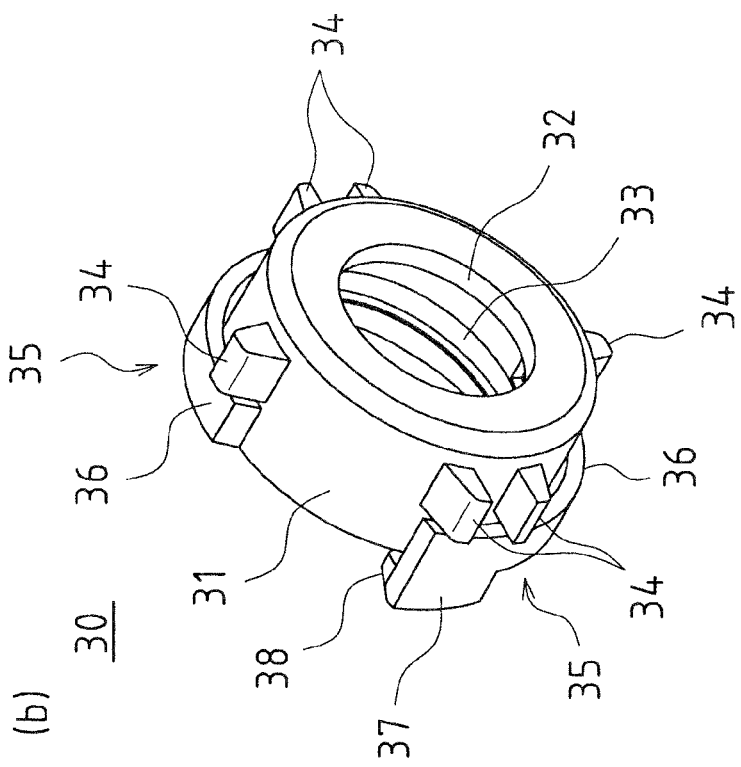
Figure 4:
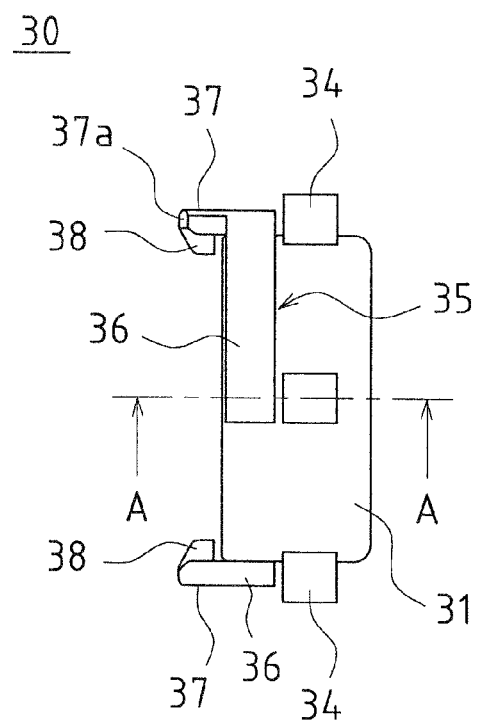
FIG. 4(a) is a plan view of the cap nut in FIGS. 3(a) and 3(b)
FIG. 4(b) is a cross-sectional view taken along line A-A in FIG. 4(a).
Figure 4:
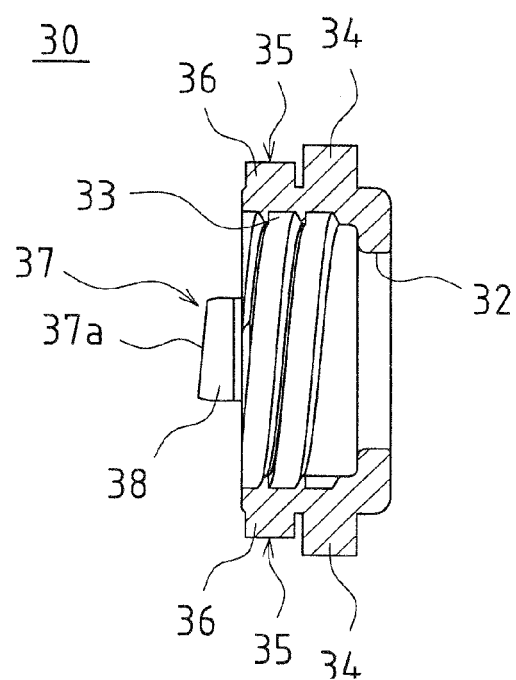
Figure 5:
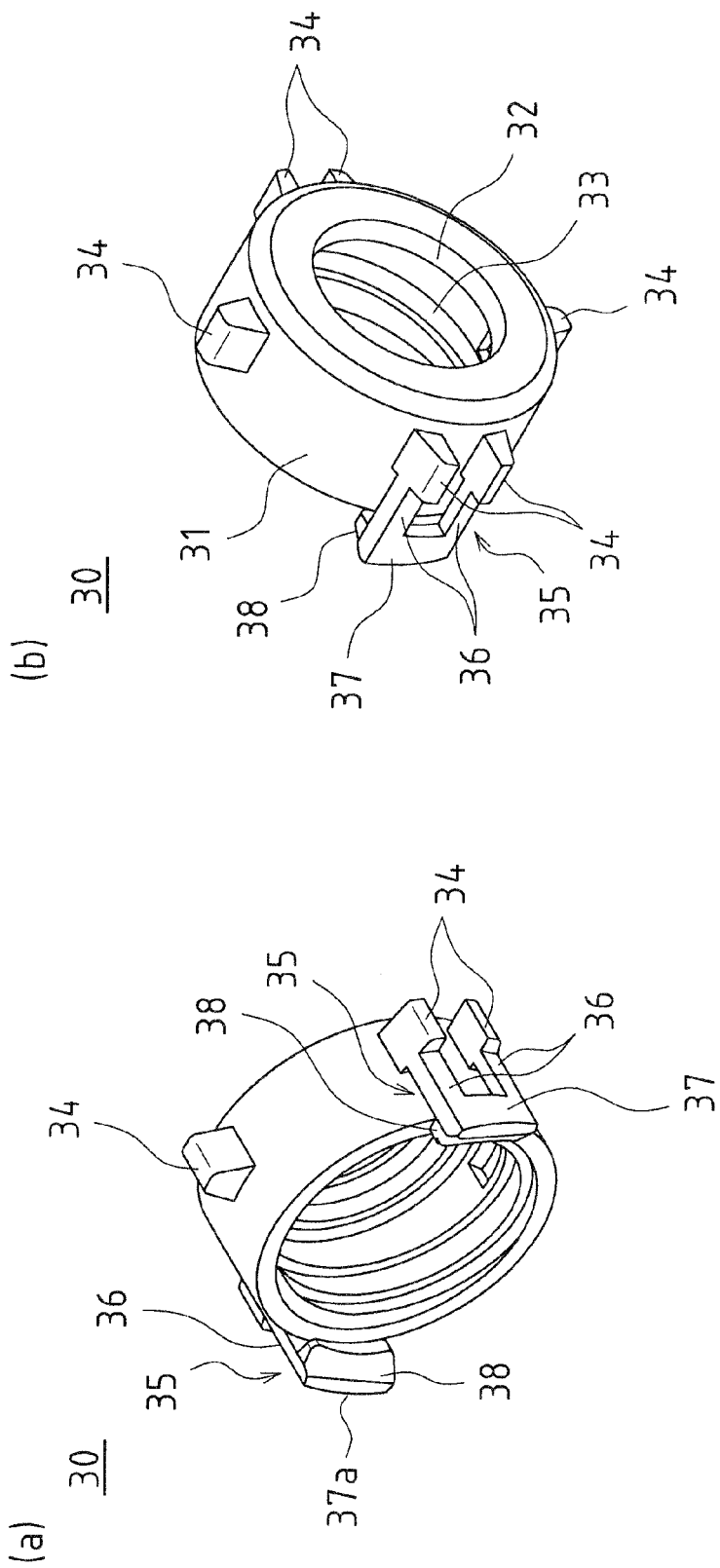
FIGS. 5(a) and 5(b) are perspective views illustrating a modified example of a cap nut in the connection structure of a tubular connection member and a joint member according to an embodiment of the present invention.
Figure 6:
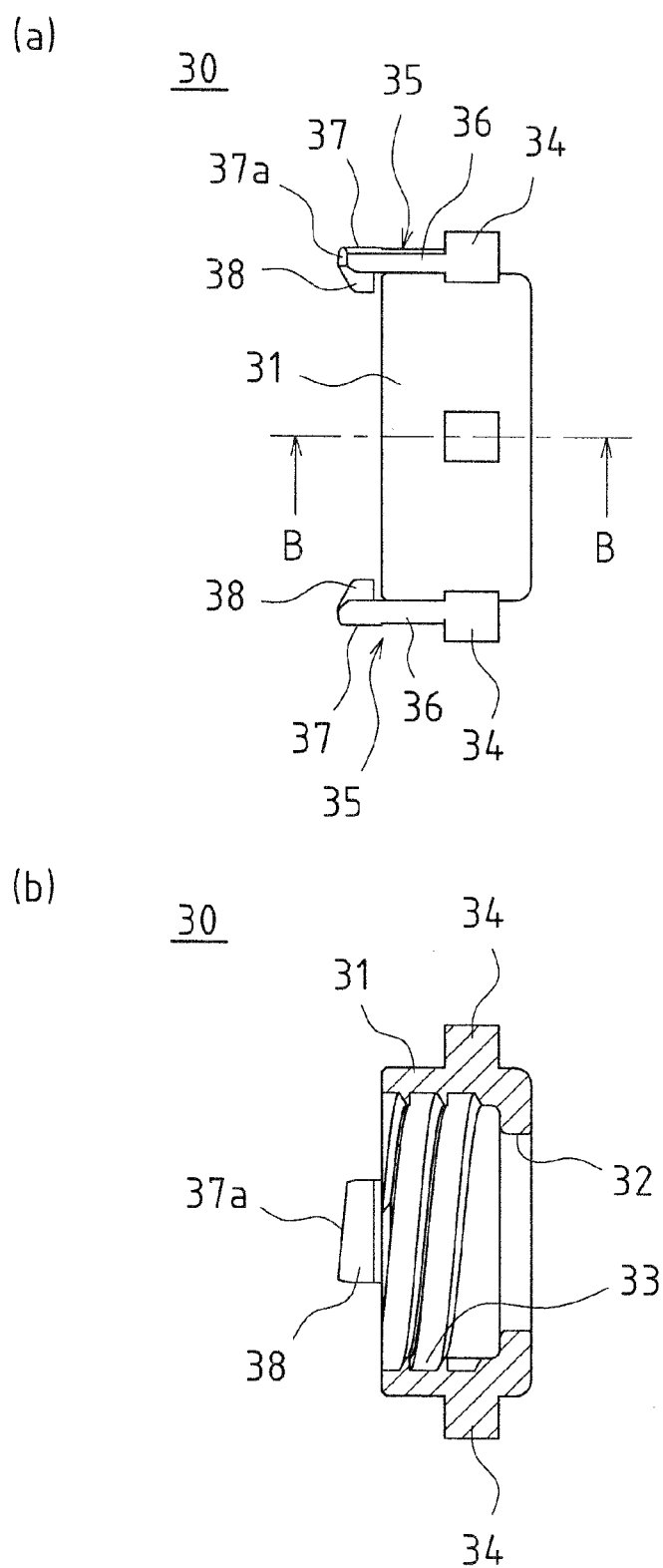
FIG. 6(a) is a plan view of the cup nut in FIG. 5(a) and (5)
FIG. 6(b) is a cross-sectional view taken along line B-B in FIG. 6(a).
Figure 7:
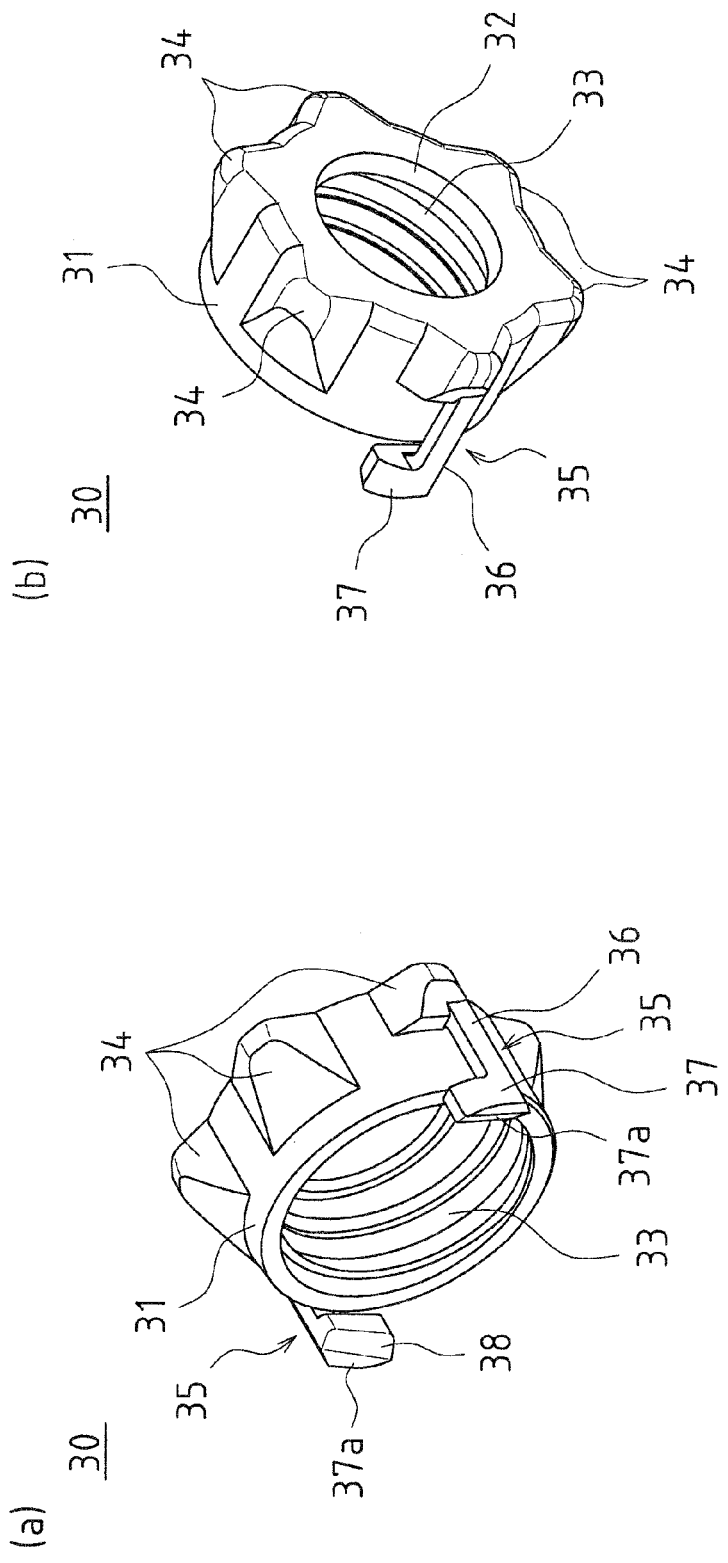
FIGS. 7(a) and 7(b) are perspective views of another modified example of the cap nut.
Figure 8:
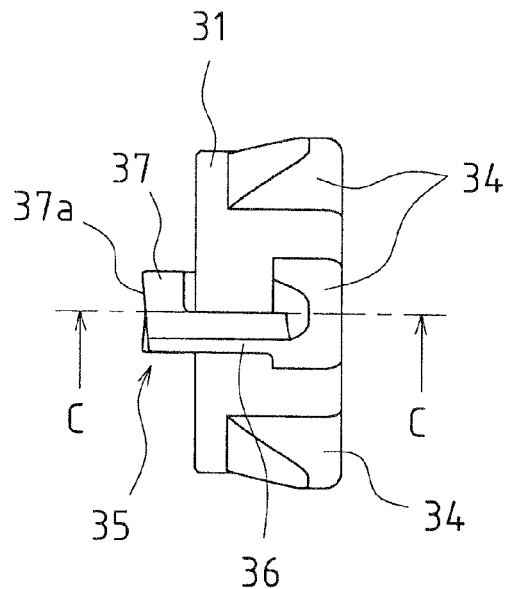
FIG. 8(a) is a plan view of the cap nut in FIGS. 7(a) and 7(b)
FIG. 8(b) is a cross-sectional view taken along line C-C in FIG. 8(a).
Figure 8:
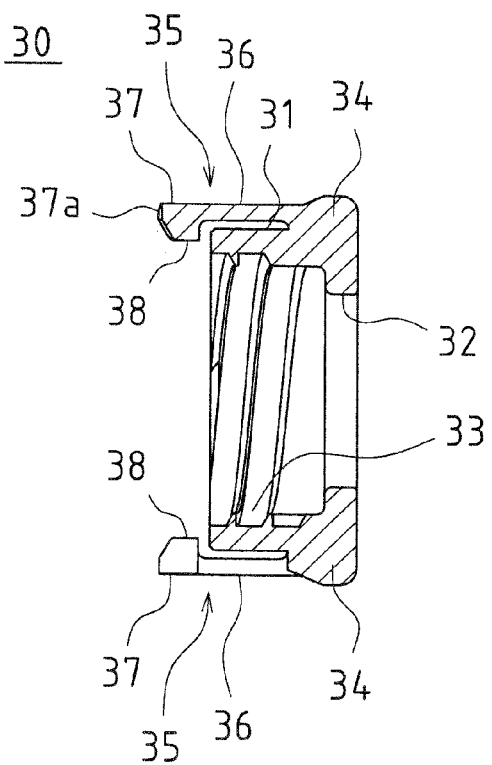

As illustrated in FIG. 4(b), the end face of the extending portion 37 is formed as an inclined face 37a whose axially extending length increases gradually in the screw-in direction in correspondence with the lead angle of the spiral ridges 14 (spiral grooves 33). Also, the side end face of the engaging lug 38 is chamfered as illustrated in FIG. 4(a). Then, as illustrated in FIG. 3(a), the tip end face of the engaging lug 38 is rounded. Such a rounded structure allows the engaging lug 38 to easily run on the outer peripheral surface of the flange 16 through the peripheral edge of the flange 16.

Note that the two spiral grooves 33 of the cap nut 30 and the two spiral ridges 14 of the branch connection portion 12 are set so that, when the cap nut 30 is screwed into the branch connection portion 12 and is rotated approximately 180 degrees, the end face of the nut body 31 of the cap nut 30 is positioned both circumferentially and axially in abutment against the side face of the flange 16 of the branch connection portion 12, and the operating parts 34 that protrude in pairs face the engaging recessed portions 161 of the flange 16.

Preferable examples of a synthetic resin used to form the cap nut 30 include engineering plastics such as polyacetal, polyethersulfone, polyphenylene sulfide, polysulfone, and polyphenylsulfone.

Next, the procedure for connecting a joint member 20 to a branch connection portion 12 of the header 10 will be described.

A joint member 20 has the cap nut 30 mounted thereon. First, a branch pipe not shown is inserted into and connected to the pipe-mounting portion 22 of the joint member 20, and the spigot portion 21 of the joint member 20 is inserted into the open end of a branch connection portion 12 of the header 10. Thereafter, the cap nut 30 is screwed into the branch connection portion 12, using the operating parts 34. This allows the two spiral grooves 33 of the cap nut 30 to be threadedly engaged with the two spiral ridges 14 of the branch connection portion 12, and about a half rotation of the cap nut 30 positions the end face of the nut body 31 of the cap nut 30 both circumferentially and axially in abutment against the side face of the flange 16 of the branch connection portion 12, which prevents any further screwing-in. At this time, the engaging lugs 38 provided on the extending portions 37 of the pair of detent members 35 of the cap nut 30 drop into and are engaged in the engaging recessed portions 161 of the flange 16.

Specifically, after start of the screwing-in of the cap nut 30, the cap nut 30 moves in the axial direction at the lead angle of the spiral ridges 14 (spiral grooves 33). Then, after an approximately 90-degree rotation of the cap nut 30, the tip edges of the engaging lugs 38 are brought into contact with the peripheral edge of the flange 16 of the branch connection portion 12 relative to the minor axis direction. In this case, the tip-side side edges of the engaging lugs 38 are in point contact with the peripheral edge of the flange 16 relative to the minor axial direction, because the side end faces of the engaging lugs 38 are formed as the inclined face 37a, which corresponds to the lead angle of the spiral ridges 14 (spiral grooves 33) and because lower portions of those side end faces are chamfered and the lower edges of tip and side end faces as well as the sides formed by intersection of those edges are rounded.

When the cap nut 30 is further screwed in, the engaging lugs 38 of the detent members 35 are pressed against the flange 16 of the branch connection portion 12 and then run on the outer peripheral surface of the flange 16 of the branch connection portion 12. At this time, the movable portions 36 of the detent members 35 are elastically deformed so that with their one ends (fixed ends) as bases, the other ends (free ends), i.e., the extending portion 37 side, are lifted off from the outer peripheral surface of the cap nut 30 and are expanded. Thereby, the engaging lugs 38 provided on the extending portion 37 run on the outer peripheral surface of the flange 16. Then, when the cap nut 30 is rotated approximately 90 degrees, the engaging lugs 38 of the detent members 35 slide along the outer peripheral surface of the flange 16, and are dropped and engaged in the engaging recessed portions 161 of the flange 16. Simultaneously with this, the movable portions 36 are restored due to their elasticity to their original shapes that extend along the outer peripheral surface of the cap nut 30.

In this case, since the detent members 35 are provided as a pair on the cap nut 30 with approximately 180-degree spacing from each other, the engaging lugs 38 provided on the detent members 35 are engaged in the pair of engaging recessed portions 161 that are formed on the flange 16 of the branch connection portion 12 with approximately 180-degree spacing from each other.

As described above, the spigot portion 21 of the joint member 20 is inserted into the open end of the branch connection portion 12 of the header 10 and the cap nut 30 mounted on the joint member 20 is screw-coupled thereto, which prevents the open end of the branch connection portion 12 from being expanded by internal water pressures in the header 10 and prevents degradation in water cut-off properties. Also, further screwing-in is stopped by the cap nut 30 abutting against the flange 16 of the branch connection portion 12. Moreover, the engaging lugs 38 of the pair of detent members 35 provided on the cap nut 30 prevents circumferential movements by being engaged in the engaging recessed portions 161 spaced approximately 180 degrees on the flange 16 of the branch connection portion 12. These effects prevent the cap nut 30 from rotating relative to the branch connection portion 12, thereby preventing the cap nut 30 from being rotated and loosened due to axial release forces caused by internal water pressures or due to vibrations or shocks caused by pulsating water pressure. Accordingly, this reliably prevents releases of the joint member 20 and occurrence of water leakage.

In addition, a simple operation such as inserting the spigot portion 21 of the joint member 20 into the branch connection portion 12 and rotating the cap nut 30 approximately 180 degrees without using any tool allows the cap nut 30 to abut against the flange 16 of the branch connection portion 12 and allows the engaging lugs 38 of the detent members 35 to be engaged in the engaging recessed portions 161 of the flange 16. This considerably simplifies connecting operations without giving any consideration to the relative positions of the engaging lugs 38 and the engaging recessed portions 161. Moreover, the spiral ridges 14 and the spiral grooves 33 are not broken due to excessive screwing-in of the cap nut 30, and the engagement of the engaging recessed portions 161 and the engaging lugs 38 can be confirmed visually. The engagement of the engaging recessed portions 161 and the engaging lugs 38 can also be confirmed by the sound of mounting such as sharp clicks as the detent members 35 are mounted on the cap nut 30 when they are restored from their elastically deformed states, so loose screwing-in does not occur.

Moreover, the detent members 35 that are integrally formed with the cap nut 30 reduce the manufacturing cost of the cap nut 30. This also avoids operation errors, such as forgetting to mount detent members, as compared with the case where the detent members are provided separately from the cap nut 30.

For removal of the joint member 20 from the branch connection portion 12 of the header 10, one's finger may be put on the extending portions 37 of the pair of detent members 35 so as to flip them up, and the operating parts 34 may be used to rotate the cap nut 30 in a direction to loosen the threaded engagement between the spiral ridges 14 of the branch connection portion 12 and the spiral grooves 33 of the cap nut 30. This causes the cap nut 30 to move in a direction to be disengaged from the flange 16, at which time the engaging lugs 38 drop off to the side of the flange 16 while sliding along the outer peripheral surface of the flange 16, and an approximately 180-degree rotation releases the threaded engagement between the spiral ridges 14 of the branch connection portion 12 and the spiral grooves 33 of the cap nut 30.

Thus, an approximately 180-degree opposite rotation of the cap nut 30 from that described above, i.e., a rotation in the opposite direction from the screw-in direction, releases the screw connection between the branch connection portion 12 and the cap nut 30. Thereafter, the spigot portion 21 of the joint member 20 is pulled out of the branch connection portion 12, whereby the joint member 20 with the cap nut 30 mounted thereon is disengaged from the branch connection portion 12. Thus, it is easy to take appropriate measures in cases of changing, reforming, or renewing joint members 20 on site.

EMBODIMENT 2

In the connection structure of a tubular connection member and a joint member according to the present embodiment, the cap nut 30 is not limited to the embodiment described above and may be implemented within other embodiments. Here, a first modified example of the cap nut 30 will be described with reference to FIGS. 5(a), 5(b), 6(a), and 6(b). Note that, in the following description, the same members as described above are denoted by the same reference numerals and a detailed description thereof will be omitted.

FIGS. 5(a), 5(b), 6(a), and 6(b) illustrate the first modified example of the cap nut 30. Detent members 35 of this cap nut 30 each have a movable portion 36 coupled to operating parts 34 that protrude as a pair. One ends of the movable portions 36 are integrally formed with the operating parts 34. The other ends of the movable portions 36 extend along the outer peripheral surface of a nut body 31 and are formed into an arm-like shape that extends in the axial direction beyond the edge face of the nut body 31. The arm-like other ends (free ends) of the movable portions 36 are each integrally formed with an extending portion 37 with an engaging lug 38.

When screwed into the open end of a branch connection portion 12 and rotated approximately 90 degrees, the cap nut 30 with those detent members 35 moves in the axial direction at the lead angle of spiral ridges 14 (spiral grooves 33) so that the tip-side side edges of the engaging lugs 38 are brought into point contact with the peripheral edge of the flange 16 of the branch connection portion 12 relative to the minor axis (minor diameter) direction. When the cap nut 30 is further screwed in, the engaging lugs 38 of the detent members 35 are pressed against the flange 16 of the branch connection portion 12 and run on the outer peripheral surface of the flange 16 of the branch connection portion 12. At this time, the arm-like movable portions 36 of the detent members 35 are elastically deformed so that with their portions coupled to the operating parts 34 as bases, the other ends (i.e., the extending portion 37 side where the engaging lugs 38 are provided) are lifted off from the outer peripheral surface of the cap nut 30 and are expanded. Thereby, the engaging lugs 38 run on the outer peripheral surface of the flange 16. Then, when the cap nut 30 is rotated approximately 90 degrees, the engaging lugs 38 of the detent members 35 slide along the outer peripheral surface of the flange 16, and are dropped and engaged in engaging recessed portions 161 of the flange 16. Simultaneously with this, the arm-like movable portions 36 are restored due to their elasticity to their original shapes that extend along the outer peripheral surface of the cap nut 30.

Also in this case, the detent members 35 are provided as a pair in two locations on the cap nut 30 with approximately 180-degree spacing. Thus, the engaging lugs 38 provided on the detent members 35 are engaged in the pair of engaging recessed portions 161 that are spaced approximately 180 degrees in the flange 16 of the branch connection portion 12.

EMBODIMENT 3

A second modified example of the cap nut 30 in a connection structure of a tubular connection member and a joint member according to an embodiment of the present invention will be described with reference to FIGS. 7(a), 7(b), 8(a), and 8(b).

In the illustrated embodiment, the cap nut 30 features the forms of operating parts 34 and detent members 35. The operating parts 34 are circumferentially spaced approximately 60 degrees on the outer peripheral surface of a nut body 31 so as to be grasped at any position during screwing-in of the cap nut 30 in order to simplify rotating operations. The operating parts 34 are each formed into a triangular shape in cross section that bulges in the radial direction.

Movable portions 36 of the detent members 35 are circumferentially spaced approximately 180 degrees on the outer peripheral surface of the nut body 31. The movable portions 36 are also arranged corresponding to the operating parts 34. One ends of the movable portions 36 are integrally coupled to the operating parts 34, and the other ends thereof extend in the axial direction beyond the end face of the nut body 31, forming a single arm. The movable portions 36 each have an extending portion 37 with an engaging lug 38 at the other end.

When screwed into the open end of a branch connection portion 12 and rotated approximately 90 degrees, the cap nut 30 with those detent members 35 moves in the axial direction at the lead angle of spiral ridges 14 (spiral grooves 33). The tip-side side edges of the engaging lugs 38 are in point contact with the peripheral edge of the flange 16 of the branch connection portion 12 relative to the minor axis (minor diameter) direction. When the cap nut 30 is further screwed in, the engaging lugs 38 of the detent members 35 are pressed against the flange 16 of the branch connection portion 12 and run on the outer peripheral surface of the flange 16 of the branch connection portion 12. At this time, the arm-like movable portions 36 of the detent members 35 are elastically deformed so that with their portions coupled to the operating parts 34 as bases, the other ends (i.e., the extending portion 37 side where the engaging lugs 38 are provided) are lifted off from the outer peripheral surface of the cap nut 30 and are expanded. Thereby, the engaging lugs 38 run on the outer peripheral surface of the flange 16. Also, when the cap nut 30 is further rotated approximately 90 degrees, the engaging lugs 38 of the detent members 35 slide along the outer peripheral surface of the flange 16, and are dropped and engaged in engaging recessed portions 161 of the flange 16, simultaneously with which the arm-like movable portions 36 are restored due to their elasticity to their original shapes that extend along the outer peripheral surface of the cap nut 30.

Also in this case, since the detent members 35 are provided as a pair in two locations on the cap nut 30 with approximately 180-degree spacing, the engaging lugs 38 provided on the detent members 35 are engaged in the pair of engaging recessed portions 161 that are spaced approximately 180 degrees in the flange 16 of the branch connection portion 12. Moreover, the operating parts 34 that are spaced at narrower intervals make it easy to grasp any operating parts 34 during screwing-in of the cap nut 30, thereby simplifying rotating operations.

EMBODIMENT 4

Next, another example of the connection structure of a tubular connection member and a joint member according to the present embodiment will be described with reference to FIGS. 9 to 11(c).

The connection structure according to this present embodiment also includes a header 10 made of a synthetic resin, a joint member 20 that is connectable to a branch connection portion 12 that is provided as a tubular connection member on the header 10, and a cap nut 30 that is rotatably and non-removably mounted on the joint member 20.

Note that the joint member 20 is identical to that described previously, so the same members are denoted by the same reference numerals and a detailed description thereof will be omitted. The cap nut 30 also has a similar structure. Thus, differences from those in the above-described embodiments are mainly described herein.

Figure 9:
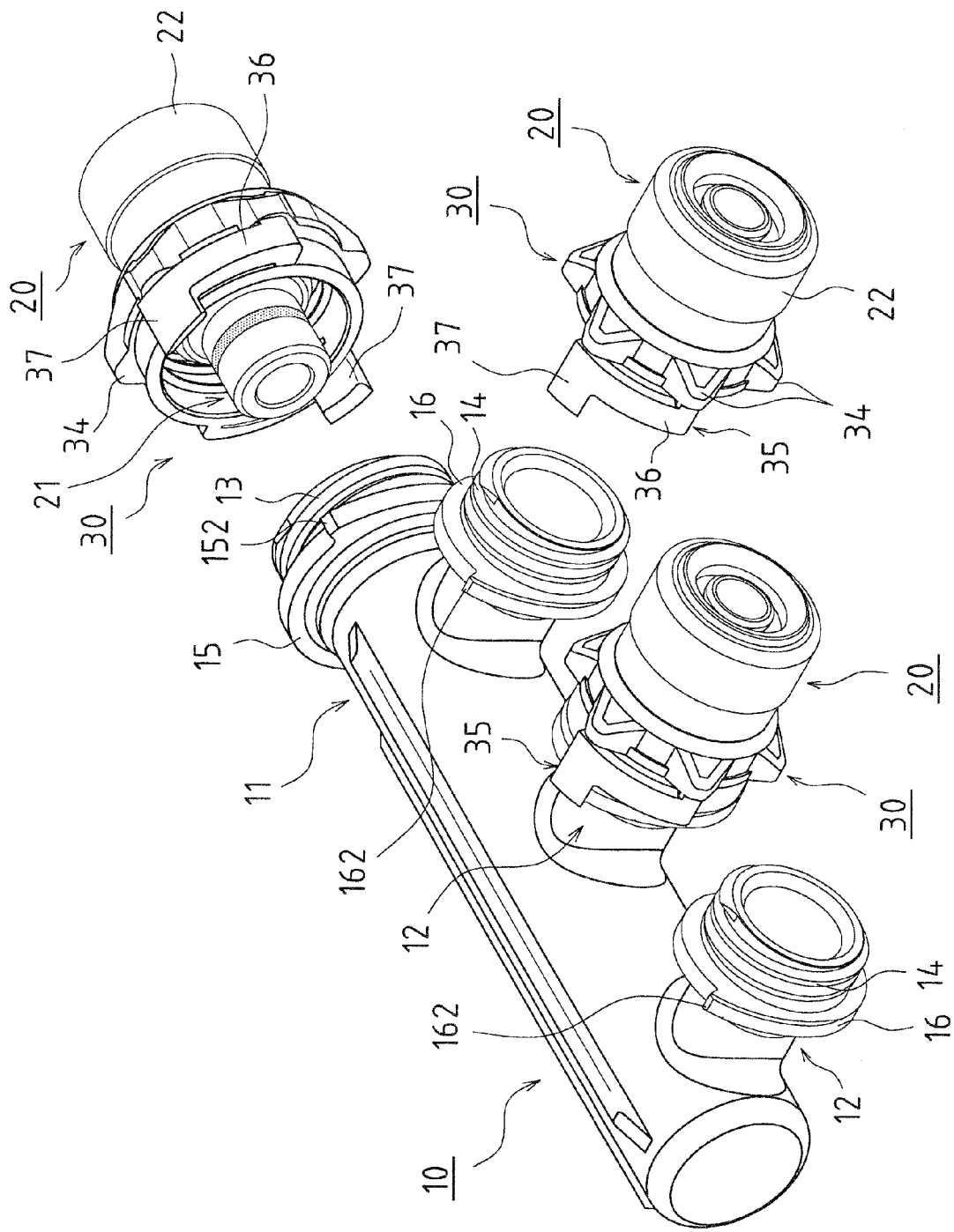
FIG. 9 is a perspective view of a connection structure of a tubular connection member and a joint member according to another embodiment of the present invention.

As illustrated in FIG. 9, the header 10 includes a generally cylindrical header body 11 that is closed at one end and is open at the other end, and multiple branch connection portions 12 that protrude from the outer peripheral surface of the header body 11. The header body 11 and the branch connection portions 12 have two spiral ridges 13 and 14, respectively, that are formed extending approximately 360 degrees on their outer peripheral surfaces near their open ends. The header body 11 and the branch connection portions 12 have generally elliptical flanges 15 and 16, respectively, that are provided near the bases of the spiral ridges 13 and 14.

Figure 10:
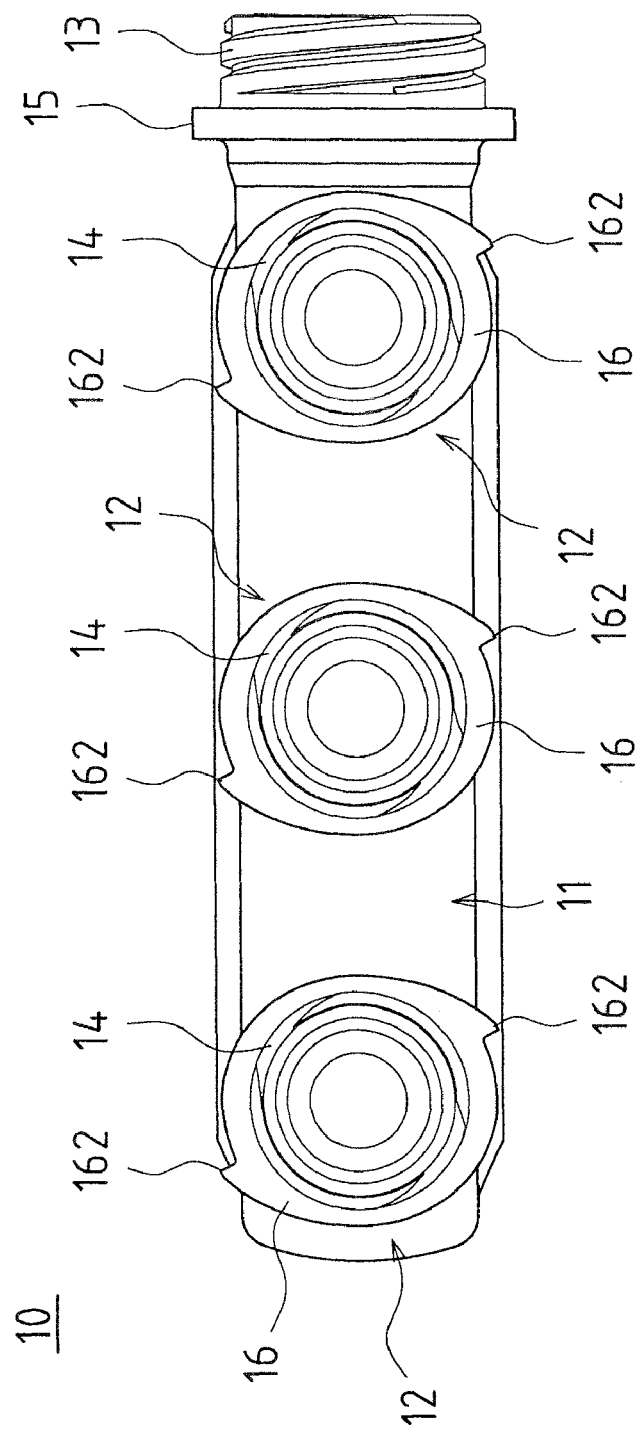
FIG. 10 is a side view of a header in FIG. 9.
Figure 11:
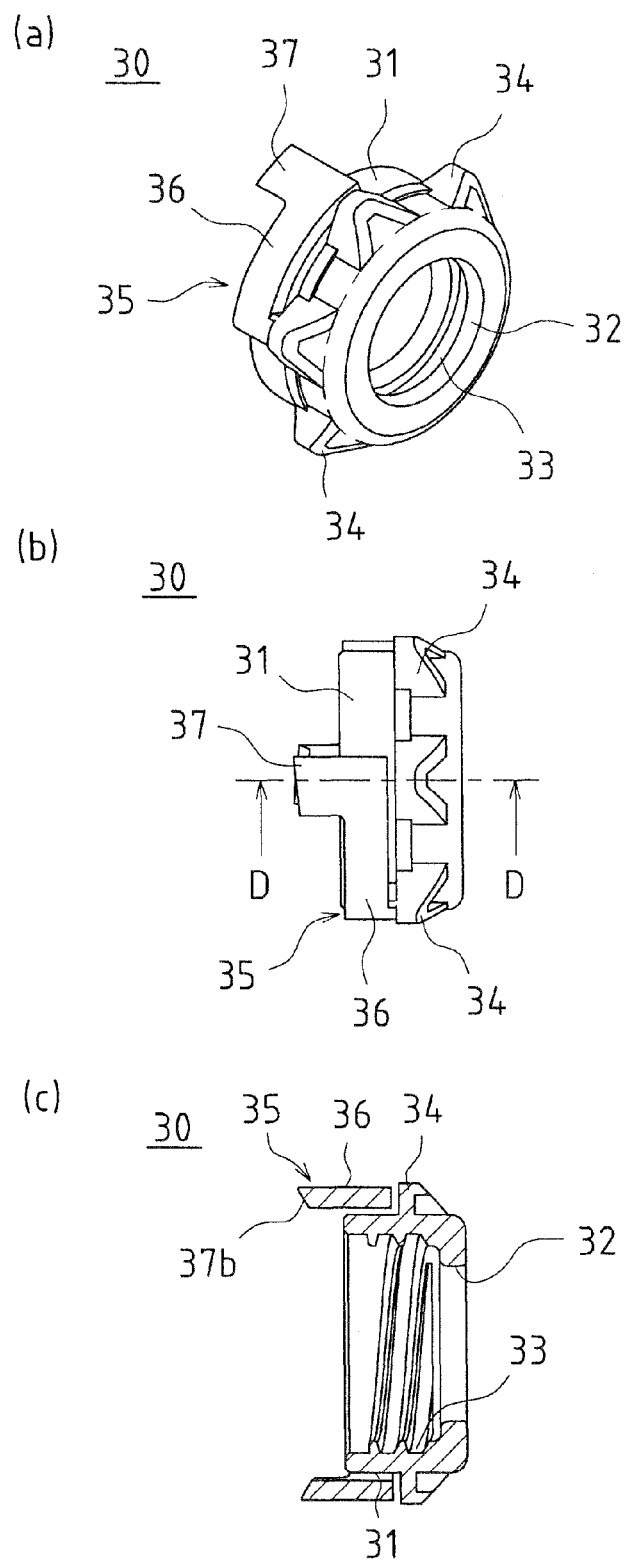
FIG. 11(a) is a perspective view of a cap nut in FIG. 9.
FIG. 11(b) is a plan view of the cap nut.
FIG. 11(c) is a cross-sectional view taken along line D-D in FIG. 11(b).

As illustrated in FIG. 10, the flanges 15 and 16 of the header body 11 and the branch connection portions 12 have locking protrusions 152 and 162, respectively, that protrude in the major axis direction and have a diameter longer than the major axis diameter.

The locking protrusions 152 and 162 have an outer peripheral surface whose diameter smoothly and gradually increases, exceeding the major axis diameter, from the minor axis side to the major axis side in a direction to screw in the cap nut 30. Also, the outer peripheral edges of the flange 15 of the header body 11 and the flanges 16 of the branch connection portions 12 on the open end side are rounded from the minor axis side to the major axis side in the direction to screw in the cap nut 30.

In the present embodiment, the header body 11 of the header 10 is formed so that the major axis directions of the flange 15 and the flanges 16 of the branch connection portions 12 are vertically oriented. Thus, the locking protrusions 152 and 162 formed respectively on the flange 15 of the header body 11 and the flanges 16 of the branch connection portions 12 are opposed to each other above and below in the vertical direction.

While the connection structure of a joint member 20 and the open end of a branch connection portion 12 will be described below, the connection structure for the header body 11 is also identical to that for the branch connection portions 12, other than the bore diameter, so a detailed description of the connection structure for the header body 11 will be omitted.

The cap nut 30, as illustrated in FIGS. 11(a) and 11(b), includes a nut body 31 and a release preventing portion 32. The nut body 31 has an inner peripheral surface having an inside diameter that corresponds to the outside diameter of the outer peripheral surface of the open ends of branch connection portions 12, and an outer peripheral surface having a diameter smaller than that of the flange 16 in the minor axis (minor diameter) direction. The release preventing portion 32 is formed to a diameter smaller than that of the inner peripheral surface of the nut body 31. The cap nut 30 is non-removably mounted and rotatably held on the joint member 20.

In the inner peripheral surface of the nut body 31 of the cap nut 30, two spiral grooves 33 are formed extending approximately 360 degrees so as to be threadedly engageable with two spiral ridges 14 formed on the open end of the outer peripheral surface of the branch connection portion 12. Also, operating parts 34 that radially expand into an approximately triangular shape in cross section are formed on approximately one half of the outer peripheral surface of the nut body 31 on the side near the release preventing portion 32. The operation units 34 are spaced at approximately 60-degree intervals circumferentially of the nut body 31. Moreover, a pair of detent members 35 are spaced approximately 180 degrees on the approximately other half of the outer peripheral surface of the nut body 31 on the opposite side from the release preventing portion 31.

One ends of the detent members 35 are integrally coupled to the locations facing the operating parts 34 on the outer peripheral surface of the nut body 31. The movable portions 36 have an outer peripheral surface whose outside diameter substantially matches the major axis diameter of the flange 16 of the branch connection portion 12. One ends of the movable portions 36 are integrally formed with the nut body 31 and extend along the arc of the outer peripheral surface of the nut body 31 over a range of approximately 60 degrees. The extending portions 37 extend in the axial direction from the other ends of the movable portions 36 beyond the end face of the nut body 31. The extending portions 37 are each also arranged corresponding to two adjacent operating parts 34. The extending portions 37 are engageable with locking protrusions 162 formed on the flange 16 of the branch connection portion 12, and the thickness of the extending portions 37 is set to be approximately equivalent to the height of the locking protrusions 162 of the flange 16.

As illustrated in FIG. 11(c), the end faces of the extending portions 37 are formed as an inclined face 37b whose axially extending length increases gradually in the screw-in direction in correspondence with the lead angle of the spiral ridges 14 (spiral grooves 33) and whose edge is chamfered. The edge of the inclined face 37b is also rounded. This allows the extending portions 37 to easily run on the outer peripheral surface of the flange 15 through the rounded peripheral edge of the flange 16.

Note that the two spiral grooves 33 of the cap nut 30 and the two spiral ridges 14 of the branch connection portion 12 are set so that, when the cap nut 30 is screwed into the branch connection portion 12 and is rotated approximately 180 degrees, the end face of the nut body 31 of the cap nut 30 is positioned both circumferentially and axially in abutment against the side face of the flange 16 of the branch connection portion 12.

Next, the procedure for connecting a joint member 20 to a branch connection portion 12 of the header 10 will be described.

First, a branch pipe not shown is inserted into and connected to a pipe-mounting portion 22 of a joint member 20 with the cap nut 30 mounted thereon. Also, a spigot portion 21 of the joint member 20 is inserted into the open end of a branch connection portion 12 of the header 10. Thereafter, the cap nut 30 is screwed into the branch connection portion 12, using the operating parts 34. At this time, rotating operations are easily performed by grasping any operating parts 34. This allows the two spiral grooves 33 of the cap nut 30 to be threadedly engaged with the two spiral ridges 14 of the branch connection portion 12, and about a half rotation of the cap nut 30 positions the end face of the nut body 31 of the cap nut 30 both circumferentially and axially in abutment against the side face of the flange 16 of the branch connection portion 12, which prevents any further screwing-in. At this time, the extending portions 37 of the pair of detent members 35 of the cap nut 30 are locked by engaging recessed portions 161 of the flange 16.

Specifically, after start of the screwing-in of the cap nut 30, the cap nut 30 moves in the axial direction at the lead angle of the spiral ridges 14 (spiral grooves 33). Then, after an approximately 90-degree rotation of the cap nut 30, the tip-side side edges of the extending portions 37 are brought into contact with the peripheral edge of the flange 16 of the branch connection portion 12 relative to the minor axial direction. In this case, the tip-side side edges of the extending portions 37 are in point contact with the peripheral edge of the flange 16 relative to the minor axial direction, because the side end faces of the extending portions 37 are formed as the inclined face 37b whose axially extending length increases gradually in the screw-in direction in correspondence with the lead angle of the spiral ridges 14 (spiral grooves 33) and whose lower edge is chamfered, and also because the edges of the side end faces are rounded.

When the cap nut 30 is further screwed in, the extending portions 37 of the detent members 35 are pressed against the flange 16 of the branch connection portion 12 and then run on the outer peripheral surface of the flange 16 through the rounded peripheral edge of the flange 16 of the branch connection portion 12. At this time, the movable portions 36 of the detent members 35 are elastically deformed so that with their one ends as bases, the other ends, i.e., the extending portion 37 side, are lifted off from the outer peripheral surface of the cap nut 30 and are expanded, whereby the extending portions 37 run on the outer peripheral surface of the flange 16. Then, when the cap nut 30 is rotated approximately 90 degrees, the extending portions 37 of the detent members 35 slide along the outer peripheral surface of the flange 16, and ride over and are locked by the locking protrusions 162 of the flange 16. Simultaneously with this, the movable portions 36 are restored due to their elasticity to their original shapes that extend along the outer peripheral surface of the cap nut 30.

In this case, since the detent members 35 are provided as a pair on the cap nut 30 with approximately 180-degree spacing from each other, the extending portions 37 of the detent members 35 are locked by the pair of locking protrusions 162 that are formed on the flange 16 of the branch connection portion 12 with approximately 180-degree spacing from each other.

As a result, the spigot portion 21 of the joint member 20 is inserted into the open end of the branch connection portion 12 of the header 10 and the cap nut 30 mounted on the joint member 20 is screw-coupled thereto. This improves water cut-off properties without the open end of the branch connection portion 12 being expanded due to internal water pressures in the header 10. Also, further screwing-in is stopped by the cap nut 30 abutting against the flange 16 of the branch connection portion 12. Moreover, the extending portions 37 of the pair of detent members 35 provided on the cap nut 30 prevent movements in a direction to loosen screwing by being locked by the locking protrusions 162 formed on the flange 16 of the branch connection portion 12, thus preventing the cap nut 30 from being rotated relative to the branch connection portion 12. This prevents the cap nut 30 from being rotated and loosened due to axial release forces caused by internal water pressures or due to vibrations or shocks caused by pulsating water pressure, thus reliably preventing releases of the joint member 20 or occurrence of water leakage.

In addition, a simple operation such as inserting the spigot portion 21 of the joint member 20 into a branch connection portion 12 and rotating the cap nut 30 about 180 degrees without using any tool allows the cap nut 30 to abut against the flange 16 of the branch connection portion 12 and allows the extending portions 37 of the detent members 35 to be locked by the locking protrusions 162 of the flange 16. This considerably simplifies connecting operations without giving any consideration to the relative positions of the extending portions 37 and the locking protrusions 162. Also, the spiral ridges 14 and the spiral grooves 33 are not broken due to excessive screwing-in of the cap nut 30, and the locking of the extending portions 37 by the locking protrusions 162 can be confirmed visually. The locking of the extending portions 37 by the locking protrusions 162 can also be confirmed by the sound of mounting such as sharp clicks as the detent members 35 are mounted on the cap nut 30 when they are restored from their elastically deformed states, so loose screwing-in does not occur.

Moreover, the detent members 35 that are integrally formed with the cap nut 30 reduces the manufacturing cost of the cap nut 30. This also avoids operation errors, such as forgetting to mount detent members, as compared with the case where detent members are provided separately from the cap nut 30.

For removal of the joint member 20 from the branch connection portion 12 of the header 10, one's finger may be put on the extending portions 37 of the pair of detent members 35 so as to flip them up, and the operating parts 34 may be used to rotate the cap nut 30 in a direction to loosen the threaded engagement between the spiral ridges 14 of the branch connection portion 12 and the spiral grooves 33 of the cap nut 30. This causes the cap nut 30 to move in a direction to be disengaged from the flange 16, at which time the extending portions 37 drop off to the side of the flange 16 while sliding along the outer peripheral surface of the flange 16, and an approximately 180-degree rotation releases the threaded engagement between the spiral ridges 14 of the branch connection portion 12 and the spiral grooves 33 of the cap nut 30.

Thus, an approximately 180-degree opposite rotation of the cap nut 30 from that described above, i.e., a rotation in the opposite direction from the screw-in direction, releases the screw connection between the branch connection portion 12 and the cap nut 30. Thereafter, the spigot portion 21 of the joint member 20 is pulled out of the branch connection portion 12, whereby the joint member 20 with the cap nut 30 mounted thereon is disengaged from the branch connection portion 12. Thus, it is easy to take appropriate measures in cases of changing, reforming, and renewing joint members 20 on site.

Note that, similarly to the connection structure for the branch connection portions 12, the connection structure for the header body 11 also uses a joint member 20 and a cap nut 30 that is rotatably and non-removably mounted on the joint member 20, so a detailed description thereof will be omitted.

EMBODIMENT 5

Figure 12:
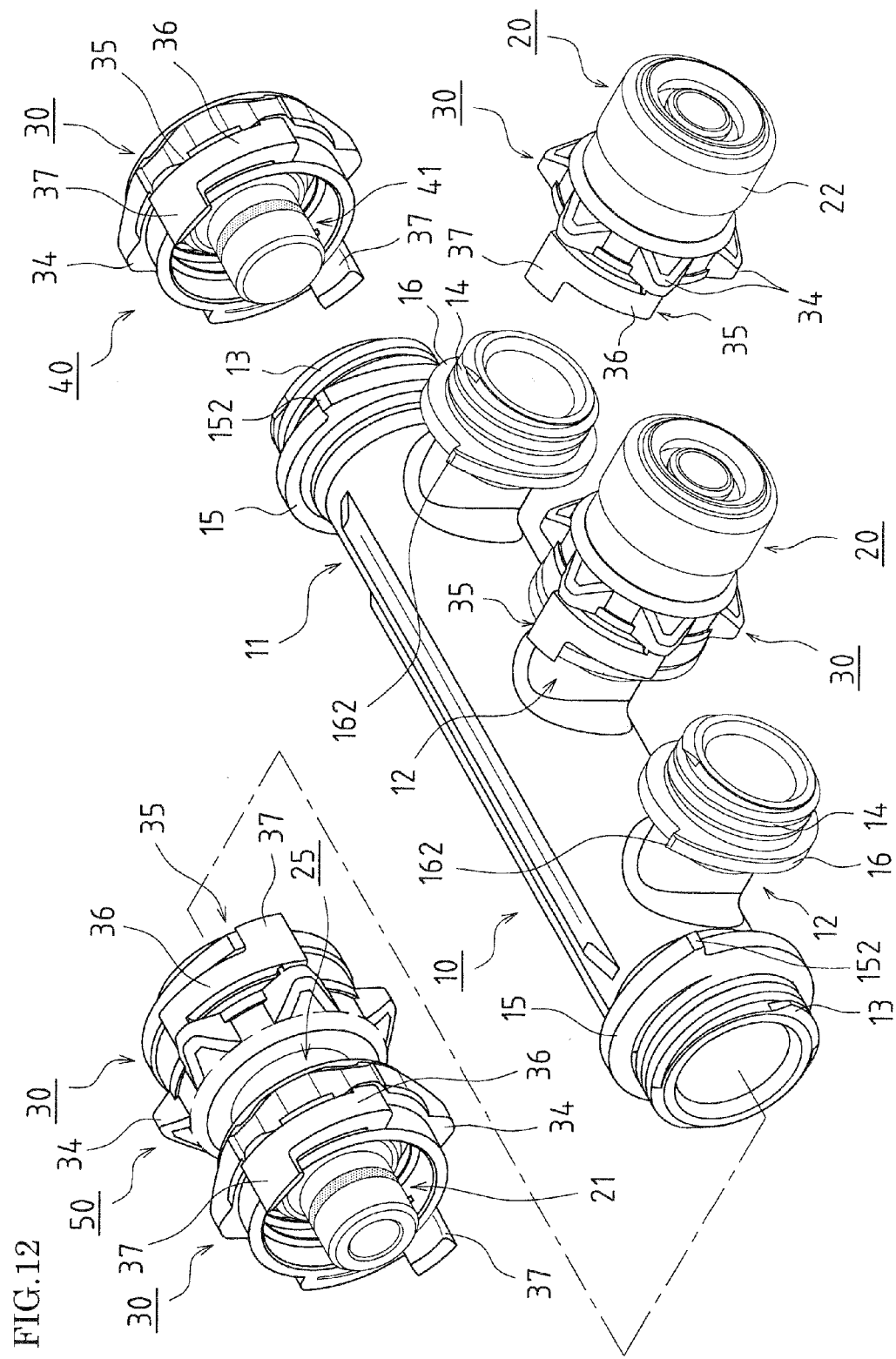
FIG. 12 is a perspective view of a connection structure of a tubular connection member and a joint member, shown together with a block cap and a connect adapter, according to another embodiment of the present invention.

FIG. 12 is a a perspective view illustrating a connection structure of a tubular connection member and a joint member according to still another embodiment of the present invention, together with a block cap and a connect adapter. While the above-described embodiments have illustrated the header body 11 of the header 10 that is closed at one end and is open at the other end, a header body 11 may have both ends open as illustrated in FIG. 12.

With the header body 11 of the header 10 having both ends open, one open end may be closed with a block cap 40, or facing open ends of header bodies 11 of adjacent headers 10 may be connected with a connect adapter 50.

Figure 13:
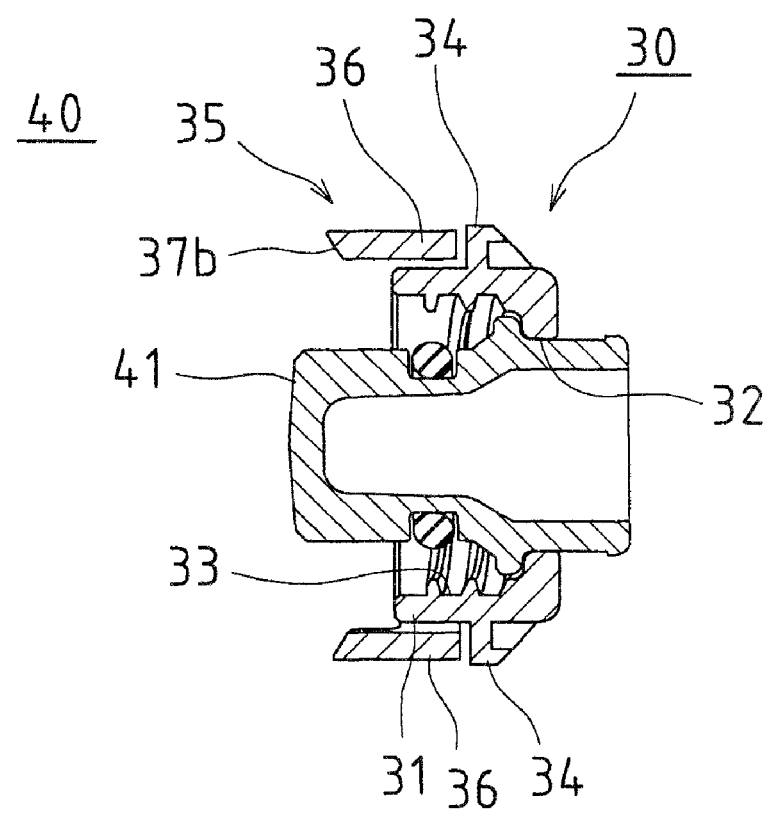
FIG. 13 is a cross-sectional view of the block cap in FIG. 12.

Here, the block cap 40 is configured to have a cap nut 30 rotatably and non-removably mounted on its plug body 41, as illustrated in FIG. 13. The block cap 40 may be used in such a manner that the plug body 41 is inserted into one open end of a header body 11 and then the cap nut 30 is screwed into the header body 11, using operating parts 34. Thereby, two spiral grooves 33 of the cap nut 30 are threadedly engaged with two spiral ridges 13 of the header body 11, and an approximately half rotation of the cap nut 30 positions the end face of the nut body 31 of the cap nut 30 positioned both circumferentially and axially in abutment with the side face of a flange 15 of the header body 11, which prevents any further screwing-in. At this time, extending portions 37 of a pair of detent members 35 of the cap nut 30 are locked by locking protrusions 152 of the flange 15.

Therefore, the plug body 41 is inserted into one open end of the header body 11 of the header 10 and the cap nut 30 mounted on the plug body 41 is screw-coupled thereto, which improves water cut-off properties without the open end of the header body 11 being expanded by internal water pressures in the header 10 and thereby allows reliable closure of the open end. Also, the cap nut 30 that abuts against the flange 15 of the header body 11 prevents further screwing-in, and the extending portions 37 of the pair of detent members 35 on the cap nut 30 prevent movements in a direction to loosen screwing by being locked by the locking protrusions 152 formed on the flange 15 of the header body 11. This prevents the cap nut 30 from rotating relative to the header body 11 and thereby prevents the cap nut 30 from being rotated and loosened due to axial release forces caused by internal water pressures or due to vibrations or shocks caused by pulsating water pressure. Accordingly, this reliably prevents releases of the cap nut 30 and occurrence of water leakage.

In addition, a simple operation such as inserting the plug body 41 into the header body 11 and rotating the cap nut 30 about 180 degrees without using any tool allows the cap nut 30 to abut against the flange 15 of the header body 11 and allows the extending portions 37 of the detent members 35 to be locked by the locking protrusions 152 of the flange 15. This considerably simplifies connecting operations without giving any consideration to the relative positions of the extending portions 37 and the locking protrusions 152. Also, the spiral ridges 13 and the spiral grooves 33 are not broken due to excessive screwing-in of the cap nut 30, and the locking of the extending portions 37 by the locking protrusions 152 can be confirmed visually. The locking of the extending portions 37 by the locking protrusions 152 can also be confirmed by the sound of mounting such as sharp clicks as the detent members 35 are mounted on the cap nut 30 when they are restored from their elastically deformed states, so loose screwing-in does not occur.

Figure 14:
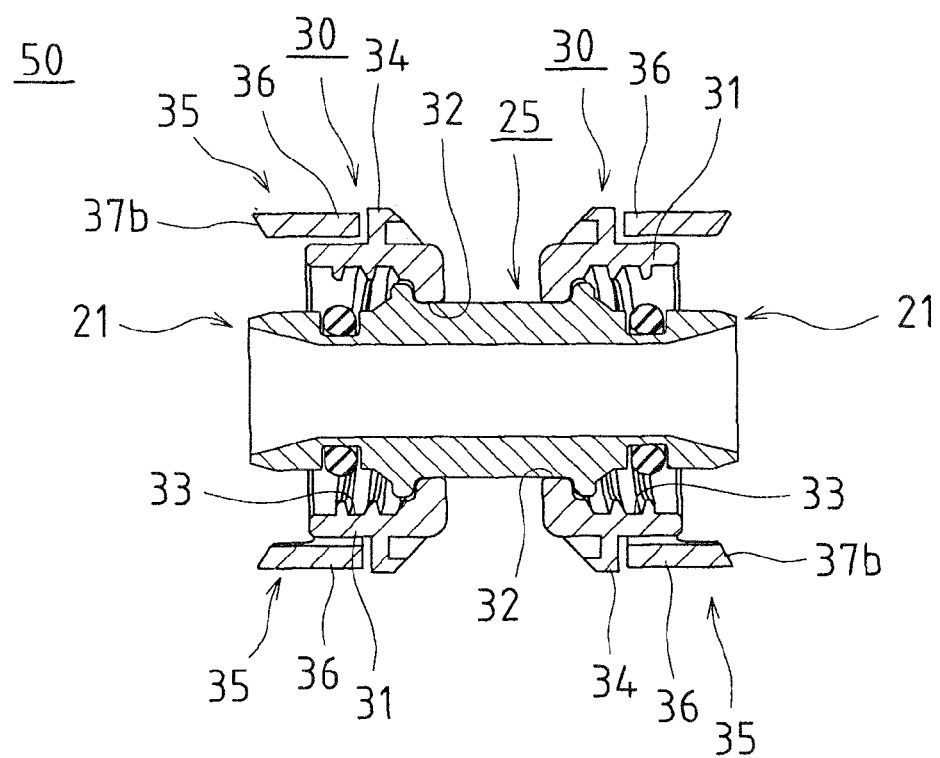
FIG. 14 is a cross-sectional view of the connect adapter in FIG. 12.

The connect adapter 50, as illustrated in FIG. 14, include a joint member 25 that has spigot portions 21 at both ends, and cap nuts 30 that are rotatably and non-removably mounted on the joint member 25. For use, one spigot portion 21 of the connect adapter 50 may be inserted into one open end of a header body 11 and then one cap nut 30 may be screwed into the header body 11, using operating parts 34. This allows two spiral grooves 33 of the cap nut 30 to be threadedly engaged with two spiral ridges 13 of the header body 11, and an approximately half rotation of the cap nut 30 positions the end face of the nut body 31 of the cap nut 30 both circumferentially and axially in abutment against the side face of the flange 15 of the header body 11, which prevents any further screwing-in. At this time, extending portions 37 of a pair of detent members 35 of the cap nut 30 are locked by locking protrusions 152 of the flange 15.

Then, in a similar manner, the other spigot portion 21 of the connect adapter 50 may be inserted into one open end of the header body 11 of another adjacent header 10, and the cap nut 30 may be screwed into the header body 11, using operating parts 34.

Therefore, one spigot portion 21 is inserted into one open end of the header body 11 of a header 10, and the cap nut 30 mounted on that spigot portion 21 is screw-coupled thereto, which improves water cut-off properties without the open end of the header body 11 being expanded by internal water pressures in the header 10. This accordingly allows connections of the header bodies 11 of facing headers 10.

Moreover, the cap nut 30 that abuts against the flange 15 of the header body 11 prevents further screwing-in, and the extending portions 37 of the pair of detent members 35 on the cap nut 30 prevent movements in a direction to loosen screwing by being locked by the locking protrusions 152 formed on the flange 15 of the header body 11. This prevents the cap nut 30 from rotating relative to the header body 11 and thereby prevents the cap nut 30 from being rotated and loosened due to axial release forces caused by internal water pressures or due to vibrations or shocks caused by pulsating water pressure, thus reliably preventing releases of spigot portions 21 and occurrence of water leakage.

In addition, a simple operation such as inserting a spigot portion 21 into a header body 11 and rotating the cap nut 30 about 180 degrees without using any tool allows the cap nut 30 to abut against the flange 15 of the header body 11 and allows the extending portions 37 of the detent members 35 to be locked by the locking protrusions 152 of the flange 15. This considerably simplifies connecting operations without giving any consideration to the relative positions of the extending portions 37 and the locking protrusions 152. Also, the spiral ridges 13 and the spiral grooves 33 are not broken due to excessive screwing-in of the cap nut 30, and the locking of the extending portions 37 by the locking protrusions 152 can be confirmed visually. The locking of the extending portions 37 by the locking protrusions 152 can also be confirmed by the sound of mounting such as sharp clicks as the detent members 35 are mounted on the cap nut 30 when they are restored from their elastically deformed states, so loose screwing-in does not occur.

The present invention may be implemented in a variety of other forms without departing from the spirit, gist or main features thereof. For this reason, the above-described embodiments are to all intents and purposes merely illustrative and should not be construed as limiting. The scope of the present invention is indicated by the claims and is not in any way restricted by the text of the specification. Furthermore, all variations and modifications of the claims within the scope of equivalency fall within the purview of the present invention.

Note that this application claims priority rights from Japanese Patent Application No. 2007-327588 filed on Dec. 19, 2007 in Japan. Its entire contents are incorporated in this application by reference. In addition, the entire contents of the documents cited in the specification are incorporated in this application by reference.

The invention claimed is:

1. A connection structure of a tubular connection member and a joint member, comprising:

a tubular connection member made of a synthetic resin and having a spiral ridge and a flange with a locking protrusion being formed on one end of its outer peripheral surface;

a joint member having at one end a spigot portion that is insertable into the tubular connection member and at the other end a pipe-mounting portion that is connectable to a connecting pipe; and a cap nut that is non-removably and rotatably mounted on the joint member, a spiral groove being formed in its inner peripheral surface, the spiral groove corresponding to the spiral ridge of the tubular connection member, and the cap nut being provided with a detent member, the detent member having a movable portion that is integrally coupled at one end to the cap nut and an extending portion that extends in an axial direction from the movable portion beyond an end face of the cap nut, wherein the spigot portion of the joint member is inserted into the tubular connection member and the cap nut is screwed into the tubular connection member so as to bring the extending portion of the detent member to be locked by the locking protrusion of the flange of the tubular connection member, wherein the locking protrusion has an outer peripheral surface whose diameter smoothly and gradually increases in a radical direction of the flange.

2. A connection structure of a tubular connection member and a joint member comprising:

a tubular connection member made of a synthetic resin and having a spiral ridge and a flange with a single pair of opposing engaging recessed portions being formed on one end of its outer peripheral surface;

a joint member having at one end a spigot portion that is insertable into the tubular connection member and at the other end a pipe-mounting portion that is connectable to a connecting pipe; and a cap nut that is non-removably and rotatably mounted on the joint member, a spiral groove being formed in its inner peripheral surface, the spiral groove corresponding to the spiral ridge of the tubular connection member, and the cap nut being provided with a detent member, the detent member having a movable portion that is integrally coupled at one end to the cap nut and an extending portion that extends in an axial direction from the movable portion beyond an end face of the cap nut and has an engaging lug that is engageable in one of the engaging recessed portions of the flange of the tubular connection member, wherein the spigot portion of the joint member is inserted into the tubular connection member and the cap nut is screwed into the tubular connection member so as to bring the engaging lug of the detent member to be engaged in one of the engaging recessed portions of the flange of the tubular connection member.

3. The connection structure of a tubular connection member and a joint member according to claim 1 or 2, wherein the spiral ridge of the tubular connection member includes two spiral ridges extending approximately 360 degrees, and the spiral groove of the cap nut includes two spiral grooves extending approximately 360 degrees.

4. The connection structure of a tubular connection member and a joint member according to claim 3, wherein the tubular connection member is either a header body that forms a header of a synthetic resin or a branch connection portion that protrudes from a header body.

5. The connection structure of a tubular connection member and a joint member according to claim 1 or 2, wherein the cap nut has operating parts circumferentially formed on its outer peripheral surface at intervals.

6. The connection structure of a tubular connection member and a joint member according to claim 5, wherein the tubular connection member is either a header body that forms a header of a synthetic resin or a branch connection portion that protrudes from a header body.

7. The connection structure of a tubular connection member and a joint member according to claim 1 or 2, wherein the flange of the tubular connection member has an approximately elliptical shape and has either an engaging recessed portion or a locking protrusion formed in positions relative to a major axis direction of the flange.

8. The connection structure of a tubular connection member and a joint member according to claim 7, wherein the tubular connection member is either a header body that forms a header of a synthetic resin or a branch connection portion that protrudes from a header body.

9. The connection structure of a tubular connection member and a joint member according to claim 1 or 2, wherein the movable portion of the detent member is either arc-shaped or arm-shaped with one end integrally coupled to the cap nut.

10. The connection structure of a tubular connection member and a joint member according to claim 9, wherein the tubular connection member is either a header body that forms a header of a synthetic resin or a branch connection portion that protrudes from a header body.

11. The connection structure of a tubular connection member and a joint member according to claim 1 or 2, wherein the tubular connection member is either a header body that forms a header of a synthetic resin or a branch connection portion that protrudes from a header body.

* * * * *